Dec. 17, 1963   H. A. PANISSIDI   3,114,394
FLUID APPARATUS
Filed Dec. 28, 1961

INVENTOR
HUGO A. PANISSIDI

BY *Robert E. Sandt*
AGENT

United States Patent Office 3,114,394
Patented Dec. 17, 1963

3,114,394
FLUID APPARATUS
Hugo A. Panissidi, Peekskill, N.Y., assignor to International Business Machines Corporation, New York, N.Y., a corporation of New York
Filed Dec. 28, 1961, Ser. No. 162,859
2 Claims. (Cl. 137—625.64)

This invention relates to fluid valves and more particularly to improvements in the combination of a master and a slave valve.

When fluid-operated devices are employed in a digital data processing system to produce high speed mechanical movements in such components as paper and tape feeds, printers, punches, etc., it is necessary that the fluid devices be timed to operate in phase with the other system components and further that the fluid devices operate at maximum speed so as not to penalize the overall operating speed of the system. A further desideratum is that the electrical control signals produced by the data processing system may be employed without amplification to produce the requisite control of the fluid devices.

It is, therefore, an object of this invention to provide a servo-valve capable of operating in response to an electrical control signal of minimal energy content, and to produce a fluid pressure output manifestive of the character of the applied electrical signal without undue delay.

It is a further object to provide a pilot and slave valve combination wherein the pilot valve is positioned by a controlling electrical impulse in the absence of fluid pressures thereon.

Yet another object is to provide a pilot and slave valve combination wherein the pilot valve is close-coupled to the slave valve so as to achieve a maximum speed of response.

A still further object is to provide a pilot and slave valve combination wherein the slave valve remains in a previously established condition until its position is changed by action of the pilot valve inconsistent with the position of the slave valve.

An even further object is to provide a pilot and slave valve combination wherein the pilot valve is subject to positional control by an electrical signal followed by application of a fluid pressure pulse to complete the movement of the pilot valve and to position the slave valve.

The foregoing and other objects, features and advantages of the invention will be apparent from the following more particular description of a preferred embodiment of the invention, as illustrated in the accompanying drawings.

Figure 1:
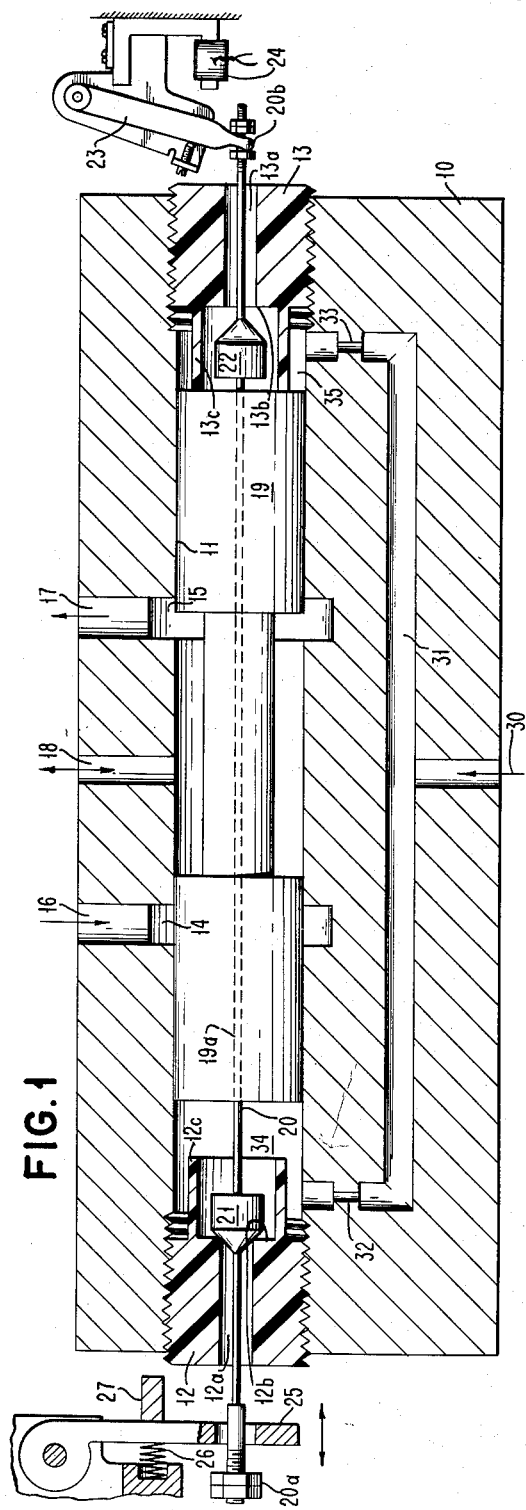
Figure 2:
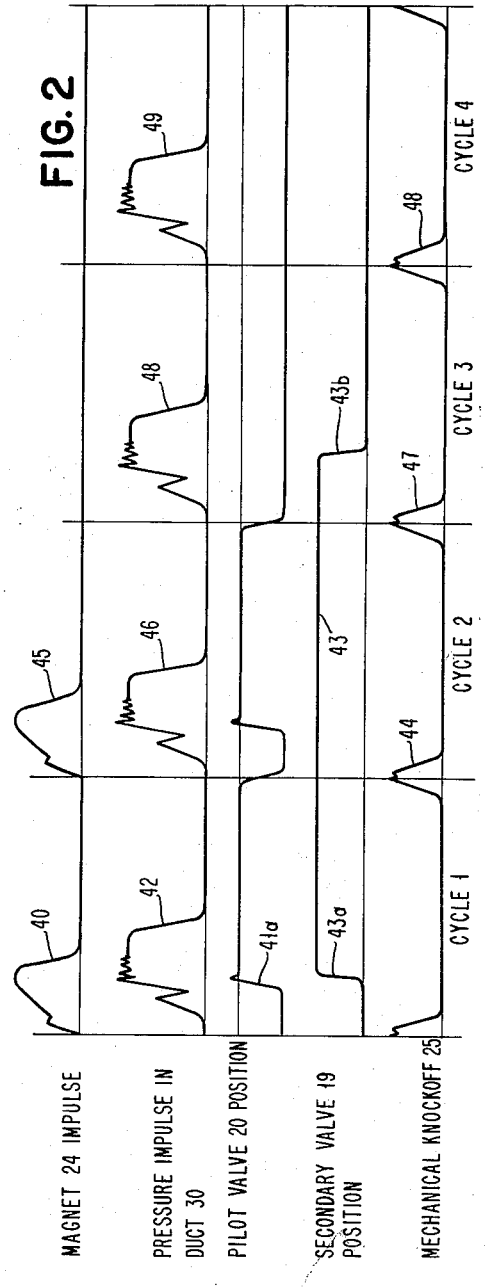

In the drawings:
FIG. 1 is a sectional view of the valves comprising the invention.
FIG. 2 is a timing diagram of the sequence of operation of the invention.

In FIG. 1 the valves comprising the invention are contained in a housing 10 having a generally cylindrical bore 11, substantially closed at both ends by plugs 12 and 13. The cylindrical bore 11 is provided with undercut grooves 14 and 15 to which are connected respectively a continuous source of high pressure (through duct 16), and a connection of sump (through duct 17). A port and duct 18 opens into the medial portion of the cylindrical bore. A two spool valve member 19 moves axially within the bore 11 so as to selectively expose the port 18 to either the source of fluid pressure in duct 16, or to sump via duct 17 in the two extreme positions of the valve member 19 as limited by the plugs 12 and 13. The valve member 19 is provided with a slender axial bore 19a through which extends a rod 20 in a free running fit. To the rod 20 are affixed, at opposite ends thereof in opposed relationship, poppet valves 21 and 22, the rod 20 continuing through the valves and the plugs 12 and 13 and exterior of the housing 10. The plugs 12 and 13 are threaded into the end of the cylindrical bore 11 in housing 10 and are provided with oversized axial bores 12a and 13a which serve as fluid outlet ports and also provide a generous clearance for the valve rod 20. The bores 12a and 13a in the plugs terminate in a shoulder 12b and 13b against which the poppet valves 21 and 22 seal in their respective extreme positions. Both plugs 12 and 13 are further provided with hollow cylindrical extensions 12c and 13c which serve as a physical stop to limit the axial movement of the valve member 19 and also to provide clearance for the poppet valves 21 and 22.

The right end of the poppet valve rod 20 terminates in a bifurcated connection 20b to the rotatable armature 23, subject to attraction by the field produced by electromagnet 24 to rock the armature 23 in a counterclockwise direction and thus move the valve rod 20 and connected poppet valves 21 and 22 to the right. The other end (left) of valve rod 20 is connected to a similar rockable member 25 which is mechanically rocked by external mechanism (not shown) in a clockwise direction. The rock member 25 is normally urged by spring 26 against a fixed stop 27 in its maximum counter-clockwise direction. In such position and with armature 23 unsealed, the rod 20 and its adjustable nuts 20a provides sufficient clearance between the nuts 20a and the rock lever 25 to permit the armature 23 to seal against the magnet core when energized. The rock lever 25 serves to restore the valve rod 20 and poppet valves 21 and 22 to the left and also provides a mechanical knockoff for the armature 23 to overcome the effects of a residual magnetism in the magnet 24.

A duct 30 in housing 10, provided with controlled surges of fluid pressure for a purpose to be explained, connects with a longitudinal duct 31 which connects to the respective end chambers 34 and 35 in the cylindrical bore 11 defined by the plugs 12 and 13, the bore 11, and the ends of the valve member 19. Disposed within the duct 31 and immediately adjacent to the chambers 34 and 35 are the respective fluid flow restrictors 32 and 33.

It is the purpose of the valve combination just described to selectively connect the duct 18 to either the pressure source 16 or to sump 17. The duct 18 may be connected to a work output device or a position-determining device such as a piston adder. The valve 19 may thus occupy the same or different control positions for each successive cycle of operation of the machine of which it is a component part and with which it must operate in phased relationship. The valve 19 may or may not be moved and should not be subjected to any unbalanced forces except when it is desired that its positional status should be changed. Therefore, if it is assumed that the parts occupy the position shown in FIG. 1, and that the duct 30 is connected to sump at this time, then the duct 18, will, by virtue of the position of the valve member 19, also be connected to sump. With these connections the valve member 19 will be subjected to sump pressure on all four of its transverse surfaces exposed to fluid, and, will therefore, experience no unbalanced force. So also when the valve 19 is in the left position will balanced forces exist on the valve. As a consequence of these balanced forces which exist in either position of the valve member 19, it will remain in its displaced position until acted upon by an unbalance of forces created by displacement of the valve stem 20 and, attached poppet valves 21 and 22, and the application of pressure to the duct 30.

As is shown in FIG. 2, a cycle of operation includes three steps, which overlap. During the first step in the cycle, the mechanical knockoff is actuated to restore the poppet valve 20 and the armature, if they have been actuated during the previous cycle. During the second increment of cycle time, the magnet 24 is energized, if such operation is dictated. Immediately following the application of the magnet impulse, and before the magnet can produce a full stroke of the poppet valve, the pressure is applied to the duct 30 which seals the poppet valve and builds the pressure in the appropriate end chamber to move the valve 19, if its position is to be changed, by a control inconsistent with its prior status.

The operation of the valve assembly with reference to a specific sequence of operations will now be examined. If, at the beginning of cycle 1 it is assumed that parts in FIG. 1 occupy the relative positions shown, then the operation of the reset bail 25 at the beginning of the cycle will induce no change in the status of the parts. Upon application of current to magnet 24 (pulse 40) the armature 23 and the poppet valve assembly will begin a movement to the right. If, as soon as the poppet valve is over center, wherein the poppet 21 has a greater clearance to its seat than the poppet 22 has to its seat, a pressure impulse at time 42 will encounter a greater restriction to flow out of the chamber 35 than it will from the chamber 34, and the poppet 22 will immediately seat, as shown by the sharp rise 41a in the pilot valve displacement curve. With this seating the pressure in chamber 35 will rise sharply to pulse pressure and the valve 19 will move to the left, as shown by the positive slope 43a of the displacement curve for the valve 19. Upon cessation of the magnet impulse and the pressure impulse, the poppet valve remains to the right and the slave valve to the left.

At the second cycle the mechanical knockoff at time 44 resets the poppet valve to the left. Upon application of the magnet impulse at time 45 and the pressure impulse at time 46, the poppet valve 20 will seat as before. The valve 19, however, is already in its left position. It will, therefore, not undergo any movement.

During the third cycle, the mechanical knockoff at time 47 resets the poppet valve. No magnet impulse is delivered during this cycle; so that the poppet valve, when the pressure pulse at time 48 is applied, will seat the poppet 21 against its seat and build the pressure in chamber 34. The slave valve 19 will, therefore, move to the right, as shown by the negative slope 43b of the valve displacement curve 43.

In the fourth cycle the knockoff at time 48 provides no reset action of poppet valve 20, as it remains in its left position from the previous cycle. The pressure pulse at time 49 seats the poppet in its left position to again build the pressure in chamber 34 to provide an unbalanced force on valve 19 to the right. As the valve is already in this position, no movement will result. A fifth cycle (were it shown) would be a repeat of either the first or fourth cycle.

While the housing 10 has been shown in FIG. 1 as removed from its immersed status in the sump fluid, it should be realized that it is so immersed as are the knockoff bail 25 and magnet 24. The fluid discharge openings 12a and 13a do not, therefore, discharge to atmosphere, as one might be misled to believe, but directly to sump. The connections 16, 17, 18, and 30 are piped connections leading out of the sump fluid to the connected devices, the duct 30 being connected, for example, to a cam operated valve timed to the operation of the mechanical knockoff bail 25 by operation of shaft rotations within the device of which the instant invention is a component part.

While the invention has been particularly shown and described with reference to a preferred embodiment thereof, it will be understood by those skilled in the art that various changes in form and details may be made therein without departing from the spirit and scope of the invention.

What is claimed is:

1. A fluid control valve, comprising:
   (a) a housing having a cylindrical bore open at both ends, and having working fluid controlling ports opening into the medial region of the bore;
   (b) a slave spool valve member slideably disposed within said bore and partitioning the bore into two open ended chambers and a medial chamber, and adapted by its displacement to control fluid through the said ports, the said spool valve member having a slender axial bore therethrough;
   (c) a plug affixed within each end of the bore in said housing, each of said plugs having an axial bore connecting the respective end chamber with the exterior of the housing, and an inwardly depending axially disposed hollow cylindrical extension against which the respective ends of said spool valve may alternately abut to limit the movement of the valve;
   (d) a pilot valve member having an elongated valve stem slideably disposed with a close fit within the axial bore in said spool valve, and projecting through the axial bores in said plugs with substantial radial clearance to the exterior of said housing, and a pair of oppositely disposed poppet valve members affixed to said stem and disposed interiorly of said cylindrical extensions on said plugs, and operative to coact alternately with the said bores in said plugs to seal the respective end chambers;
   (e) a duct in said housing supplied with fluid under pressure during a predetermined time interval;
   (f) a respective passageway connecting each of said end chambers with said duct, each passageway having a fluid flow restrictor therein adjacent to the respectively connected end chamber;
   (g) reset means for positioning said pilot valve member to one of its extremes of movement, wherein a first of said poppet valve members is positioned adjacent to its associated seat and the second poppet valve is displaced from its associated seat, prior to the application of the fluid under pressure to said duct;
   (h) signal controlled means selectively operable during a time interval between the positioning of said pilot valve by said reset means and the application of fluid under pressure to said duct, to displace said pilot valve member to a position wherein the second of said poppet valves is positioned adjacent to its seat, and the first of said poppet valves is displaced from its associated seat;
   whereby upon application of the fluid under pressure to said duct, the poppet valve which has been positioned adjacent to its seat will be sealed by the higher pressure fluid to produce an unbalanced force on the end faces of said slave valve to move said slave valve toward the lesser force and against its associated plug.

2. A fluid control valve for controlling the flow of fluid in work-device fluid control ports, comprising:
   (a) a housing having a cylindrical bore therethrough and work-device fluid control ports in the medial region of said bore;
   (b) a spool valve slideably disposed in said bore, and operable by its positional status in said bore to selectively expose said ports for the control of the working fluid therethrough, the said spool valve partitioning said bore in said housing into two open end chambers, and a medial chamber, and having a slender axial bore through the spool;
   (c) a poppet valve having a stem slideably disposed in the axial bore in said spool valve and oppositely disposed poppet members affixed to said stem;
   (d) plugs in the ends of said bore in said housing, said plugs having axial bores therethrough to vent the said end chambers, and coacting with said poppet members to seal the bores in the plugs in alternate succession as said valve stem is moved to and fro;

(e) means permitting the discharge of fluid through said bores in said plugs and out of said end chambers;

(f) means for selectively moving said poppet valve stem to a positional status wherein one of said poppet members is adjacent to the bore in its associated plug and the other poppet member is spaced from the bore in its associated plug;

(g) a duct connecting to each said end chamber and having a fluid flow restrictor therein adjacent to each said end chamber, (h) and means for applying fluid under pressure to said ducts at periodic intervals following the selective moving of said poppet valve member.

References Cited in the file of this patent
UNITED STATES PATENTS

| | | |
|---|---|---|
| 2,722,234 | Macgeorge et al. | Nov. 1, 1955 |
| 2,993,477 | Panissidi | July 25, 1961 |
| 3,037,525 | Wiegers | June 5, 1962 |